April 29, 1941.  C. M. HATHAWAY  2,240,184
ELECTRIC GAUGE
Filed March 26, 1938
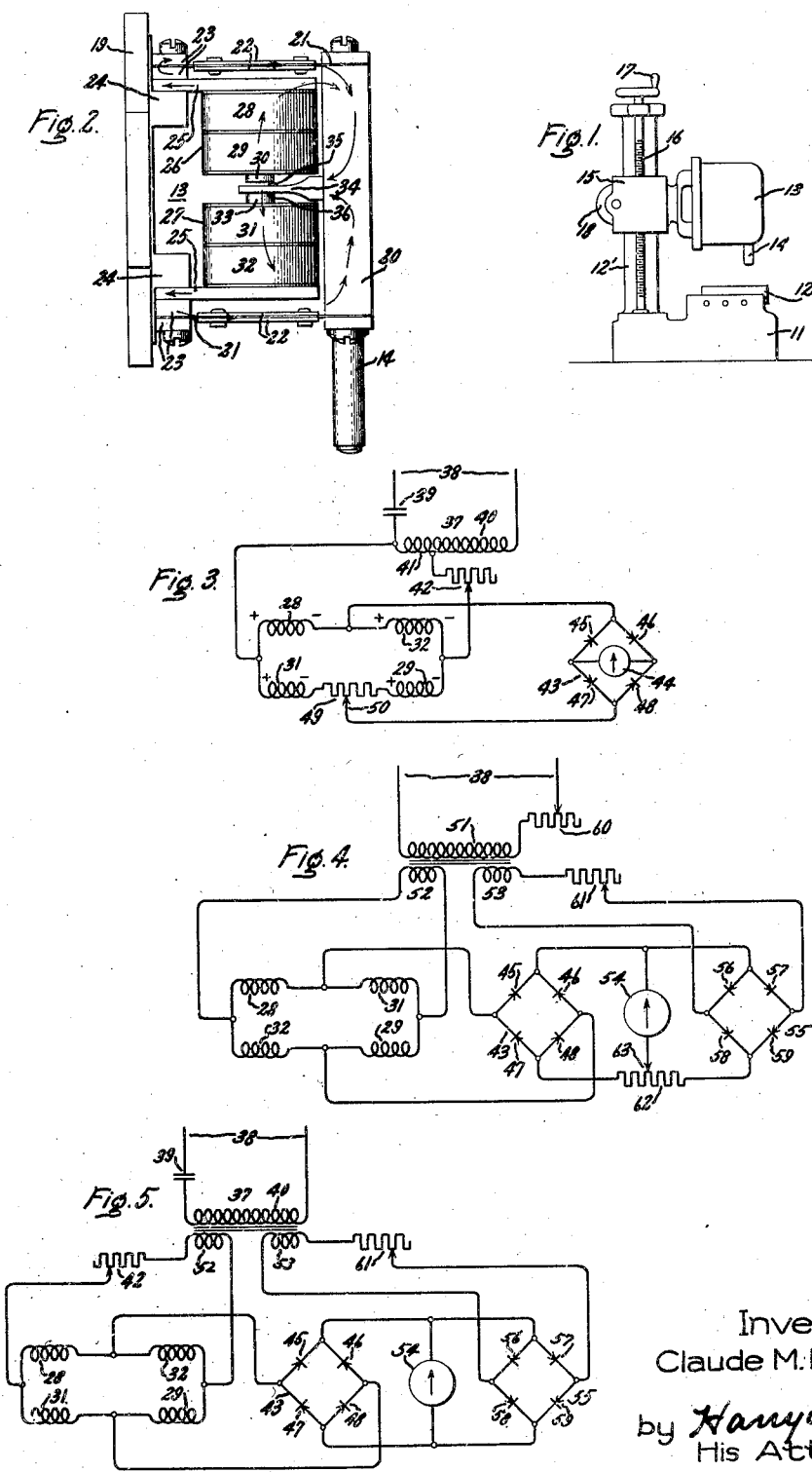
Inventor:
Claude M. Hathaway,
by Harry E. Dunham
His Attorney.

Patented Apr. 29, 1941

2,240,184

UNITED STATES PATENT OFFICE 2,240,184

ELECTRIC GAUGE

Claude M. Hathaway, Niskayuna, N. Y., assignor to General Electric Company, a corporation of New York Application March 26, 1938, Serial No. 198,337

8 Claims. (Cl. 177—351)

My invention relates to electric gauges and concerns particularly electric gauges of the type in which the reluctance of the magnetic circuit is varied in response to variations in the quantity to be gauged.

It is an object of my invention to provide improvements in apparatus and measurements for measuring various quantities, such as dimensions of objects, pressures, etc.

It is an object of my invention to provide electric gauging arrangements of high sensitivity and low cost as well as to provide gauges which are highly compact.

A further object of my invention is to provide convenience in operation and adjustment of electric gauging arrangements.

Still another object of my invention is to provide electric gauging arrangements in which the operation is independent of variations in supply voltage.

Another object of my invention is to provide electric gauges having sensitivity control and zero adjustment which are independent of each other.

It is also an object of my invention to provide electric gauges in which sensitivity-control is independent of both the supply voltage and the zero adjustment.

Other and further objects and advantages will become apparent as the description proceeds.

In carrying out my invention in its preferred form, I provide an electric gauge head having a magnetic circuit including a pair of electromagnets with their magnetic flux paths in parallel and including variable air gaps. A movable armature is provided to form the edges of the air gaps so that movement of the armature produces opposite variation in the lengths of the air gaps. The movable armature is mechanically connected to a spindle or member which moves in response to variations of dimensions or other quantities being gauged. The electromagnets are connected in a circuit including a measuring instrument for indicating variations in the relative reluctances of the two air gaps, thus providing measurements of the quantity to be gauged.

The invention may be understood more readily from the following detailed description when considered in connection with the accompanying drawing and those features of the invention which are believed to be novel and patentable will be pointed out in the claims appended hereto. In the drawing, Fig. 1 is an assembly view in elevation of one embodiment of my invention. Figure 2 is a side elevation of mechanism included in the gauge head of the apparatus of Figure 1. Figure 3 is a circuit diagram representing the electrical connections of the coils shown in Figure 2. Figure 4 is a modified circuit diagram suitable for use with the apparatus of Figure 2, and Figure 5 is another modified circuit diagram which may be used with the apparatus of Figure 2. Like reference characters are utilized throughout the drawing to designate like parts.

Although my invention is not limited to apparatus for gauging dimensions of mechanical pieces, such apparatus forms one of its most valuable applications, and in Figure 1 I have illustrated apparatus for measuring outside dimensions of small parts such as blocks and rods. The apparatus of Figure 1 consists of a base 11 carrying a removable platen 12 upon which a piece to be gauged may be placed. There is attached to the base 11 a post 12' carrying a gauge head 13, with a movable spindle 14, adapted to come in contact with the upper surface of a piece resting upon the platen 12, so that the position of the spindle 14 within the gauge head 13, which is measured by the apparatus, depends upon the dimension of the piece being gauged. In order to adapt the gauge to measurement of pieces varying widely in dimensions, the gauge head 13 may be adjustably secured to the post 12' by means of an adjustable support 15 arranged to slide vertically on the post 12' and including a threaded nut, not shown, adapted to cooperate with a screw 16 which may be turned by hand with a crank 17. For tightening the adjustable support 15 at any given position on the post 12', a clamping screw 18 may be provided.

The gauge head 13 as shown in Figure 1 is mounted in a casing with only the spindle 14 projecting. The apparatus within the casing which is shown in Figure 2 is carried by a non-magnetic base 19 which may be produced by die-casting, and is secured in any suitable manner to the adjustable support 15 of Figure 1. The spindle 14 which, in the arrangement illustrated is placed vertically, is carried by a vertically movable carrier block 20 composed of magnetizable material which is movably secured to the base 19 by means of springs 21 composed of magnetizable material. In order to increase the stiffness of the springs 21 and in order to maintain the carrier block 20 in substantially absolute rigidity with respect to lateral motion either perpendicular or parallel to the base 19, reinforcing plates 22 are provided which are secured to the springs 21 on either side thereof, and extend very nearly the distance between the points of attachment of the springs 22 to the carrier block 20 and the clamps 23 securing the springs 21 to the base 19.

The base 19 is formed with lugs 24, to which both the spring securing clamps 23 and horizontal brackets 25 are secured. Two double-coil electromagnets 26 and 27 are secured to, and mounted between, the brackets 25, the electromagnet 26 being suspended from the upper bracket 25 and the electromagnet 27 resting upon the lower bracket 25. Brackets 25 as well as the clamps 23 are composed of magnetizable material. The electromagnet 26 consists of two coils or windings 28 and 29 wound around a core 30, and the electromagnet 27 consists of two coils 31 and 32 wound around a core 33. The only portions of the cores 30 and 33 which are visible are the pole tips which are spaced from each other a sufficient amount to allow an armature 34 carried by the carrier block 20 to be located therebetween and leave air gaps 35 and 36 on either side of the armature 34.

The electric gauge consists essentially of the gauge head having electromagnets 26 and 27 with the air gaps 35 and 36 variable in response to motion of the spindle 14 and means such as shown in Figure 3, 4 or 5 for measuring the relative reluctances of the air gaps 35 and 36.

The gauge head includes the base 19, carrier block 20 carrying the spindle 14, a pair of electromagnets 26 and 27 and a movable armature 34 carried by the block 20 in a position between electromagnets 26 and 27 in order that movement of the spindle 14 will simultaneously decrease the air gap formed between the armature 34 and one electromagnet and increase the air gap formed between the armature and the other electromagnet, so as to multiply or amplify the effect of spindle movement on the electrical circuits of the apparatus.

In the arrangement represented by Figure 3, a source of regulated voltage is provided such as a voltage regulating transformer 37 energized by a source of alternating current 38 and consisting essentially of a capacitor 39 and a winding 40 in series, the winding 40 having a saturable core which is operated above the point of saturation. Thus if any variations in the voltage of the source 38 take place, although the current flowing through the winding 40 and the capacitor 39 in series will vary, the flux in the core and the voltage induced in the portion 41 of the winding serving as the secondary will remain substantially constant. The regulated or substantially constant voltage provided by the secondary winding 41 is connected to the coils 28, 29, 31 and 32 through a sensitivity-control rheostat 42. The coils 28, 29, 31 and 32 are connected in series parallel to form a Wheatstone bridge circuit. The diagonal arm of the Wheatstone bridge circuit is formed by an alternating current-responsive device such as a rectifier voltmeter 43 consisting of a direct current-responsive instrument 44 and four rectifiers such as copper oxide rectifiers 45, 46, 47 and 48, for example, arranged in the well-known full-wave rectifying connection. The two coils of each electromagnet are so connected as to be diagonally opposite arms of the electrical bridge in order that variations in the air gaps will produce opposite variations in the reluctances of the magnetic circuits and of the reactances of adjacent coils in the bridge for the purpose of magnifying the unbalance of the bridge produced by the spindle 14. Furthermore, the connections are preferably such that voltages of corresponding polarity are induced in all the coils in the bridge. The polarities at a given instant are represented by "+" and "—" signs in Figure 3. It will be observed that in both Figures 3 and 4 the coils 28 and 29 of the magnet 26 are diagonally opposite arms of the bridge and the coils 31 and 32 of this magnet 27 are also diagonally opposite arms of the bridge. However, in one case, the coils 29 and 31 are lower arms of the bridge and in the other case they are the right hand arms of the bridge. I have found either arrangement of the coils in the bridge to be satisfactory. The turns of the coils are wound in such a direction that two flux paths are formed joining at the center of the block 20 and running parallel through the armature 34. In order to facilitate setting the instrument 44 to zero when the spindle 14 is in a position corresponding to the standard dimension from which deviations are to be measured, the zero adjustment potentiometer 49 is provided in one arm of the bridge between the coils 29 and 31. In the arrangement of Figure 3 a potentiometer tap 50 slidable along the potentiometer 49 serves as one of the connections to the current responsive unit 43.

Figure 3 illustrates the Wheatstone bridge formed by the electrical circuits of the coils 28, 29, 31 and 32. The arrows in Figure 2 represent the magnetic circuits of the coils 28, 29, 31 and 32. One such magnetic circuit may be traced from the top surface of the armature 34 through the coil 29, thence through the coil 28, the upper brackets 25 and 23, the spring 21, and the upper half of the carrier block 20 back through the armature 34. The other magnetic circuit may be traced through the coils 31 and 32, the lower brackets 25 and 23, the lower spring 21, the lower half of the block 20, back through the armature 34. It will be observed that the magnetic circuit of the coil 29 consists of the air gap 35 and a portion of the core 30 surrounded by coil 29, and that the magnetic circuit of the coil 31 consists of a portion of the core 33 within the coil 31 and the air gap 36. However, the greater portion of the reluctances is represented by the variable air gaps 35 and 36. Thus, when the spindle 14 is in such a position that the air gaps 35 and 36 are equal, substantially equal fluxes cross these air gaps since the coils 29 and 31 are arranged substantially symmetrical in the electrical circuit, and normally carry like currents, but when the air gaps become unequal, the reluctances become unequal in an exaggerated degree due to the fact that, in the first place, the reluctance of an air space is inversely proportional to its length and, secondly, if the magnetic material is operated in the portion of the magnetization curve below the point of maximum permeability, with the unbalancing of the magnetic circuits when the fluxes become unbalanced, the permeabilities of the cores become unbalanced and thus further unbalance the reluctances. Inasmuch as the reactances of the coils are inversely proportional to their reluctances, movement of the spindle 14 produces a greatly exaggerated unbalance of the potential drops in the electrical Wheatstone bridge circuit.

The instrument 44 may be calibrated in terms of the deviation of the spindle 14 from its normal position, in other words, in terms of the dimensions of a block or other piece to be gauged and which is placed on the platen 12 under the spindle 14. In the arrangement of Figure 3, the sensitivity of the apparatus may be adjusted by changing the setting of the rheostat 42 so that a given deviation from a normal dimension produces a greater or less deflection of the instrument 44 and of course, other deviations from standard produce in proportion greater or less deflections. The zero adjustment is made by placing a standard piece on the platen under the spindle 14 and moving the tap 50 in one direction or the other until the instrument 44 reads zero.

Rectifiers of the dry type operate more nearly perfectly as rectifiers when they are carrying a given amount of current, and a more satisfactory scale distribution of the scale 44 may, therefore, be obtained by utilizing a suppressed zero instrument, as the instrument 44, that is, an instrument which reads zero when it is actually carrying a current. If such a suppressed zero instrument is utilized it will be understood, of course, that the zero adjustment potentiometer 49 is so set that the Wheatstone bridge is actually slightly unbalanced when the instrument 44 reads zero or a standard dimension, if it is calibrated in terms of dimensions. If the instrument 44 is carrying current when it reads zero, it will be apparent that changing the setting of the sensitivity-control rheostat 42 will vary the current carried, and therefore, upset the zero adjustment. Accordingly, zero adjustment should be made after the sensitivity-control adjustment has been made.

In order to make the sensitivity-control and the zero adjustment independent of each other, the circuit of Figure 4 may be employed in which no voltage regulator or constant output voltage transformer is necessary to maintain constancy of the zero setting during operation. In this case, an ordinary transformer 51 is employed having two secondary windings 52 and 53. The coils 28, 29, 31 and 32 in the gauge head are arranged in the manner of a Wheatstone bridge as before, and connected to the secondary winding 52. The cross arm of the Wheatstone bridge also consists of a full-wave rectifier 43 as before; the ouput side of the rectifier 43 feeds into the measuring instrument. However, the circuit of Figure 4 differs from that of Figure 3 in that a measuring instrument 54 of the zero center type is employed, and the instrument 54 receives current not only from the rectifier 43, but also from a second rectifier 55 energized by the other secondary winding 53 of the transformer 51. The rectifier 55 is similar in type to the rectifier 43, consisting of four copper oxide rectifiers 56, 57, 58 and 59. The rectifiers 43 and 55, however, are connected so as to have opposite polarities with respect to the instrument 54 and, consequently, no current flows in instrument 54 and it stands at zero when the outputs of the rectifiers 43 and 55 are equal.

For control of sensitivity, a sensitivity-control rheostat 60 is provided which is connected in the primary side of the transformer 51 instead of in the secondary side. For setting the instrument 54 at zero, a zero adjustment rheostat 61 is provided which is connected in series with the secondary winding 53 of the transformer 51. In case the current-resistance characteristics of the rectifiers 43 and 55 should not be equal, the rectifier balancing potentiometer 62 is provided having a movable tap 63, to which one connection of the instrument 54 is made.

Since the rectifiers 43 and 55 are balanced against each other, and the instrument 54 normally carries a zero current for its zero setting, it will be evident that voltage variations of the source 38 will not affect the zero setting because, regardless of primary voltage of the transformer 51, the outputs of the rectifiers 43 and 55 will tend to flow with equal strengths in opposite directions in the instrument 54. In making initial adjustment of the apparatus, the zero adjustment rheostat 61 is adjusted until the instrument 54 reads zero, whereupon the output voltage of the primary side of the transformer 51 is varied by varying the adjustment of the sensitivity-control rheostat 60 to make sure that the instrument 54 remains at zero. If the instrument 54 should deflect from its zero setting it would be an indication that the current-resistance characteristics of the rectifiers 43 and 55 did not quite balance, in which case, the tap 63 of the rectifier balancing potentiometer 62 would be moved one way or the other until the instrument 54 retained its zero setting regardless of the voltage applied to the primary side of the transformer 51. Having adjusted the potentiometer 62 and the zero adjustment rheostat 61, the sensitivity adjustment is made by placing an object of known deviation from standard dimensions between the platen 12 and the spindle 14 and adjusting the rheostat 60 to give the desired reading of the instrument 54. Maximum sensitivity will obviously be obtained with a minimum amount of resistance in series with the current source 38.

From the foregoing explanation of the operation of Figure 4, it has become apparent that fluctuations in the voltage of the source 38 would cause the sensitivity of the measurement to fluctuate likewise. If it is desired to make sensitivity independent of voltage fluctuations a circuit such as that of Figure 5 may be utilized in which the sensitivity is likewise independent of the zero adjustment. In the arrangement of Figure 5, varying the sensitivity tends to affect the zero setting. However, this is a matter of minor consequence since, the zero setting may readily be adjusted after each change in the desired sensitivity, and it is of most importance that the sensitivity should be independent of the zero adjustment. In the arrangement represented by Figure 5, a voltage regulating transformer 37 is employed again. However, in this case the transformer 37 is provided with two secondary windings 52 and 53, analogous to the arrangement of Figure 4. The sensitivity-control rheostat 42 of Figure 3 is employed, which is connected in series with the input to the Wheatstone bridge formed by the coils 28, 29, 31 and 32, and the zero adjustment rheostat 61 of Figure 4 is employed as well as the feature described in connection with Figure 4 of employing a zero center instrument 54 fed by two oppositely connected full-wave rectifiers 43 and 55, the output sides of which are connected respectively to the Wheatstone bridge formed by the coils 28, 29, 31 and 32, and the secondary winding 53 of the transformer 37. A potentiometer for balancing rectifier characteristics such as that shown at 62 in Figure 4 may also be used in Figure 5 if desired.

In the arrangement of Figure 5, since a voltage regulating transformer is employed, the output voltages of the secondary windings 52 and 53 remain constant regardless of variation of the voltage of the source 38, and therefore, neither the sensitivity nor the zero setting of the apparatus is affected by fluctuations in supply voltage. In adjusting the apparatus, the approximate zero setting is obtained by means of the rheostat 61, by placing an object of standard dimension in the gauge. Sensitivity adjustment is made by placing an object of known deviation from the standard dimension in the gauge, and adjusting the rheostat 42 to give the desired reading of the instrument 54, whereupon the standard object is replaced in the gauge and the final zero adjustment is made by means of the rheostat 61. Since the sensitivity of the apparatus is independent of the zero adjustment, it will be unnecessary to readjust the rheostat 42.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A gauge comprising a movable member, a pair of double-coil electromagnets placed substantially end to end with pole tips spaced apart, an armature movably mounted between said pole pieces and of such dimensions as to leave variable air gaps between said pole tips and said armature, a mechanical connection between said armature and said movable member, and means responsive to relative magnitudes of the reluctances of said electromagnets.

2. An electric gauge comprising a pair of double coil electromagnets each having a core composed of magnetizable material with pole portions, an armature movable in response to variations in magnitude of a quantity to be measured and having a portion in proximity to the pole portion of one of said electromagnets and another portion in proximity to the pole portion of the other of said electromagnets and spaced from said pole portions whereby air gaps are formed between said pole portions and said armature varying oppositely in response to movement of said armature, a source of current and a current-responsive device, the coils of said electromagnets being connected in series parallel to said source of current, and said current-responsive device being connected between the common points of the series pairs to form a diagonal arm of the Wheatstone bridge.

3. In an electric gauge having four coils so arranged that the relative reluctances of two of the coils vary in response to variations in a quantity to be measured, the combination of a voltage regulating transformer having an input side adapted to be connected to a source of alternating current, and an output side to which said coils are connected in series parallel, a current-responsive unit connected to the common terminals of the series pairs of said coils to form a diagonal arm of a Wheatstone bridge circuit, a sensitivity-control rheostat connected in series with the output side of said transformer and said series parallel coils, and a zero adjustment potentiometer consisting of a resistor having a movable tap, said resistor being connected in series between the coils of one of said pair of series coils, and said tap forming a connection at one end of said bridge cross arm.

4. In combination four coils of an electric gauge so arranged that the relative reluctances of two of the coils vary in response to variations in magnitude of a quantity to be measured, means for supplying alternating current at substantially constant voltage, an alternating current-responsive unit and a zero adjustment potentiometer, two of said coils being connected in series, said zero adjustment potentiometer being connected between the remaining two coils in series therewith, said series units being connected in multiple to said current supply source, and said current-responsive unit being connected to the common terminal of said first pair of coils and the adjustable tap of said potentiometer to form the diagonal arm of a Wheatstone bridge circuit.

5. An electric gauge comprising four coils, means for causing the relative reluctances of a pair of said coils to vary in response to variations in a quantity to be measured, a transformer having a primary winding and a pair of secondary windings, a sensitivity-control rheostat, a zero adjustment rheostat, a rectifying device having input and output terminals, a second rectifying device having input and output terminals, a zero center current-responsive instrument, and a rectifying-characteristic-balancing potentiometer including a resistor and an adjustable tap, the primary winding of said transformer being adapted to be connected in series with the sensitivity-control rheostat, said gauge coils being connected in series parallel to one of the secondary windings of said transformer, the input terminals of the first of said rectifying devices being connected to the common terminals of the series pairs of said coils, whereby the first of said rectifier units forms the cross arm of said Wheatstone bridge circuit, the side arms of which are formed by said coils, the input terminals of the second of said rectifying devices being connected to the second of the secondary windings of said transformer in series with said zero adjustment rheostat, one of the output terminals of one of said rectifying devices being connected to one of the output terminals of the other rectifying devices and the resistor of said potentiometer being connected between the remaining output terminals, the connections being such that terminals of opposite polarity are connected together, said instrument being connected between the first mentioned connected output terminals of said rectifiers and the adjustable tap of said potentiometer.

6. A gauge comprising a pair of current conducting elements having impedances, the relationships of which are adapted to vary in response to variations in a quantity to be measured, a second pair of impedances, said pairs of impedances being connected in series parallel with the input terminals at either end of the series pairs, and output terminals in the middle of the series pairs, a current-responsive device connected to said output terminals, means for supplying voltage to the input terminals of said parallel impedances, means for supplying voltage to said current-responsive instrument of opposite polarity to that supplied by the output terminals of said series parallel circuit, and means for maintaining said latter applied voltage proportional to the voltage applied to the input terminals of said series parallel circuit.

7. An electric gauge comprising a pair of coils connected in series adapted to have their relative impedances vary in response to variations in a quantity to be measured, a pair of current carrying elements connected in series, a voltage regulating transformer having secondary windings, a sensitivity-control rheostat, a pair of rectifiers each having input and output terminals, a zero adjustment rheostat and a current-responsive unit, said coils and current carrying elements being connected in series parallel to one of said secondary windings in series with said sensitivity-control rheostat, the input terminals of one of said rectifiers being connected between the common terminal of the said coils, and the common terminal of said current-carrying elements, whereby the rectifier forms a diagonal arm of a Wheatstone bridge circuit, the input terminals of the second rectifier being connected to the second of said secondary windings in series with said zero adjustment rheostat, the output terminals of said rectifiers being connected together with the polarities in opposition and said current responsive instrument being connected between the output terminals of said rectifiers.

8. A gauge comprising a pair of current carrying elements connected in series, a second pair of current carrying elements also connected in series, two of said current carrying elements being adapted to have their relative impedances vary in response to variations in a quantity to be measured, a pair of current supply means with a fixed relationship between their voltages, said current carrying elements being connected in series parallel to one of said current sources, a current-responsive unit in operative connection to the common point of one of said series pair of current carrying elements and to the common point of the other of said pair of current-carrying elements, said current-responsive unit also being in operative connection to the second of said current supply sources, the polarities of the voltages applied to said current responsive unit being opposite.

CLAUDE M. HATHAWAY.